(12) United States Patent
Davis et al.

(10) Patent No.: US 8,200,861 B2
(45) Date of Patent: Jun. 12, 2012

(54) DONGLES AND METHODS OF MANUFACTURING A DONGLE

(75) Inventors: David M. Davis, Portsmouth (GB); Christopher J. Nother, Portsmouth (GB)

(73) Assignee: Xyratex Technology Limited, Havant (GB)

( * ) Notice: Subject to any disclaimer, the term of this patent is extended or adjusted under 35 U.S.C. 154(b) by 540 days.

(21) Appl. No.: 12/374,115

(22) PCT Filed: Jul. 13, 2007

(86) PCT No.: PCT/GB2007/002627
§ 371 (c)(1),
(2), (4) Date: Jan. 16, 2009

(87) PCT Pub. No.: WO2008/009901
PCT Pub. Date: Jan. 24, 2008

(65) Prior Publication Data
US 2009/0291571 A1 Nov. 26, 2009

Related U.S. Application Data

(60) Provisional application No. 60/831,213, filed on Jul. 17, 2006.

(51) Int. Cl.
*H05K 7/20* (2006.01)

(52) U.S. Cl. ............ 710/62; 710/64; 361/748; 361/752; 361/788; 439/76.2

(58) Field of Classification Search .................... 361/788
See application file for complete search history.

(56) References Cited

U.S. PATENT DOCUMENTS

| | | | |
|---|---|---|---|
| 4,894,739 A | | 1/1990 | Kobayashi |
| 5,040,993 A | * | 8/1991 | Krug et al. ............... 439/75 |
| 5,277,615 A | | 1/1994 | Hastings et al. |
| 5,596,484 A | | 1/1997 | Suzuki |
| 6,050,831 A | * | 4/2000 | Wu et al. ............... 439/76.1 |
| 6,077,093 A | * | 6/2000 | Seong et al. ............ 439/79 |
| 6,105,091 A | | 8/2000 | Long |
| 6,480,925 B1 | | 11/2002 | Bodo |
| 6,558,201 B1 | * | 5/2003 | Begley et al. ............ 439/638 |
| 6,574,726 B2 | * | 6/2003 | Crane, Jr. ............... 712/33 |
| 6,648,695 B1 | * | 11/2003 | Wu ....................... 439/638 |
| 6,663,434 B1 | * | 12/2003 | Wu ....................... 439/638 |
| 6,850,410 B2 | * | 2/2005 | Peeke et al. ............ 361/679.32 |
| 6,887,108 B2 | * | 5/2005 | Wu ....................... 439/638 |
| 7,481,679 B1 | * | 1/2009 | Stotz et al. ............ 439/638 |
| RE41,749 E | * | 9/2010 | Stolz et al. ............ 439/638 |

(Continued)

FOREIGN PATENT DOCUMENTS

DE 20-2005-000419 4/2005

(Continued)

*Primary Examiner* — Anthony Q Edwards
(74) *Attorney, Agent, or Firm* — Pillsbury Winthrop Shaw Pittman LLP

(57) ABSTRACT

A dongle for connecting a disk drive assembly to the backplane of a storage enclosure is disclosed. The dongle includes: a housing having a disk drive connector portion having a plurality of contact pins for connecting to a disk drive assembly and having a PCB holding portion having walls that define a recess; and, a PCB located within the recess, the PCB having a plurality of contact fingers on at least one surface at an edge of the PCB to form a backplane connector for connecting to the backplane. At least some of the disk drive connector contact pins are in electrical connection with at least some of the contact fingers of the backplane connector.

25 Claims, 16 Drawing Sheets

U.S. PATENT DOCUMENTS

Figure 1:
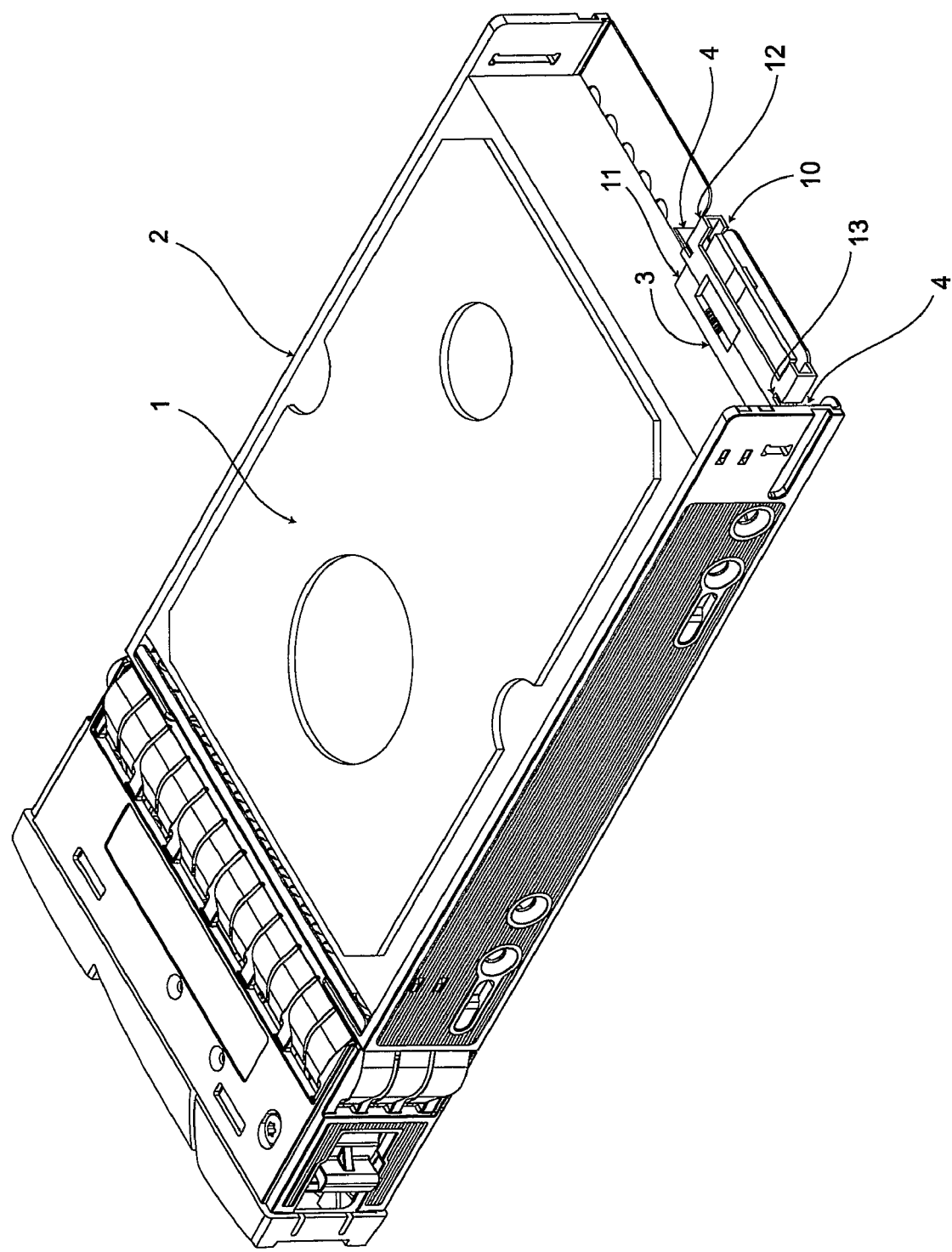

| | | |
|---|---|---|
| 2002/0012235 A1* | 1/2002 | Kupnicki et al. ............. 361/785 |
| 2003/0003809 A1 | 1/2003 | Maiers |
| 2003/0036296 A1* | 2/2003 | Cox et al. ...................... 439/108 |
| 2004/0023559 A1* | 2/2004 | Wu .............................. 439/638 |
| 2004/0029458 A1* | 2/2004 | Wu ........................... 439/928.1 |
| 2004/0193791 A1 | 9/2004 | Felton et al. |
| 2004/0253873 A1 | 12/2004 | Spykerman et al. |
| 2006/0286867 A1* | 12/2006 | LeGrow et al. .......... 439/620.24 |

FOREIGN PATENT DOCUMENTS

EP    0 940 743    9/1999

* cited by examiner

A-A (4:1)

DONGLES AND METHODS OF MANUFACTURING A DONGLE

CROSS REFERENCE TO RELATED APPLICATIONS

This application is the U.S. National Phase of PCT/GB2007/002627, filed Jul. 13, 2007, which claims priority to U.S. Provisional Application No. 60/831,213, filed Jul. 17, 2006. The content of both applications are incorporated herein by reference in their entirety.

The present invention relates to dongles and methods of manufacturing a dongle.

In disk drive mass storage enclosures it is known to removably mount disk drive assemblies in carriers and to removably mount the carriers in a storage enclosure. The storage enclosure typically has a backplane (which, as used herein, includes a "midplane" or similar connection plane) having a plurality of connectors through which connection is made to corresponding connectors of the disk drive assemblies. These connectors allow the backplane to provide power to the disk drive assemblies and allow data and control information to be passed between each disk drive assembly and the storage enclosure. Individual disk drive assemblies can be removed from the storage enclosure in their storage carriers for maintenance, replacement, etc.

Modern disk drive assemblies typically have complex firmware incorporated within to control various disk drive functions. Due to its complexity, it is possible for the firmware to get into a "hung" or looping state. The most practicable way of resolving this situation is to cycle the power to the disk drive assembly, i.e. to effectively shut down the disk drive by removing its power supply and then to restore its power supply to allow the firmware to resume its operation from its initial state. It is preferable that the power can be shut down to selected disk drives assemblies individually, so that other disk drive assemblies that are not in a hung state can continue operating without being affected by the power being cycled to a hung disk drive assembly. To this end, it is necessary to include some power control circuitry somewhere between the power supply of the storage enclosure and the firmware of the disk drive assembly.

The power control circuitry may be included on the backplane of the storage enclosure. This arrangement has the effect of adding to the complexity of the backplane, since the power control components are relatively prone to failure, which has the undesired consequence of lowering the MTBF (mean time between failures) of the backplane. This is particularly undesirable since the backplane is not a field replaceable unit, meaning that the whole enclosure must be powered down so that the backplane can be removed and replaced. Alternatively, the entire chassis of the storage enclosure including the backplane must be replaced. In either case, this means that the whole enclosure is unavailable for storage and retrieval of data during this time. Also the cost of replacing the backplane or entire chassis will be high. However, putting the control circuitry on the drive backplane has the advantage that the cost of providing the control circuitry for each disk drive assembly will be relatively low.

Another known arrangement involves putting the control circuitry on an interposer or "dongle" connected between the backplane of the storage enclosure and each disk drive assembly. The dongle typically comprises a printed circuit board (PCB) holding the power control circuitry, and two connectors for connecting respectively to the disk drive assembly and to the backplane of the storage enclosure. The dongle is typically mounted to the disk drive carrier and is connected between the disk drive assembly and the backplane of the storage enclosure so as to provide power control to the disk drive assembly. These dongles can be individually replaced in the event of failure of their power control components by removing the disk drive carrier from the storage enclosure, disconnecting the dongle from the disk drive assembly and then replacing the dongle. This arrangement has the advantage that a passive backplane can be maintained. This alleviates the above mentioned problems about the MTBF of the backplane. However, this arrangement has the disadvantage of requiring more parts, i.e. an additional circuit board and two connectors, and as a result is typically more expensive to provide than having the control circuitry on the backplane.

U.S. Pat. No. 6,442,022 discloses a known "interposer" for connecting between a disk drive assembly and the backplane of a storage enclosure. However, this interposer does not have any active circuitry on board, but rather acts as an adaptor, allowing disk drive assemblies with a variety of connector types to be used with a storage enclosure having connectors of a single type on its backplane.

According to a first aspect of the present invention, there is provided a dongle for connecting a disk drive assembly to the backplane of a storage enclosure, the dongle comprising: a housing having a disk drive connector portion having a plurality of contact pins for connecting to a disk drive assembly and having a PCB holding portion having walls that define a recess; and, a PCB located within the recess, the PCB having a plurality of contact fingers on at least one surface at an edge of the PCB to form a backplane connector for connecting to a said backplane, wherein at least some of the disk drive connector contact pins are in electrical connection with at least some of the contact fingers of the backplane connector.

The dongle may have a lower manufacturing cost than prior art dongles, since it may have fewer and smaller parts and may be assembled more simply. Known dongles typically require two separate connectors which must be attached to and connected to a separate PCB holding any circuitry. The preferred arrangement of the dongle in effect allows a dongle to be formed out of two parts, the housing part and the PCB part, by using the PCB to form an integral part of one or all of the connectors and thus to integrate the PCB better into the dongle. As a result, the dongle can be smaller than in the prior art. This can help reduce the effect of the dongle on airflow within the enclosure. This also leads to a lower manufacturing cost. Also, if the PCB fails, only that dongle needs to be replaced and the whole storage enclosure does not have to be powered down.

Preferably, the housing walls are arranged to mechanically lock to and rigidly support the PCB. This again allows a dongle to be manufactured from fewer parts with simpler assembly. Preferably, both the edge of the PCB and a portion of the housing are arranged to form the mating part of the backplane connector and both contribute to the mechanical connection between the dongle and a said backplane. This allows more complex connector types to be implemented rather than relying on the edge connector formed by the PCB alone. For example, the housing portion can contribute any or all of keyed parts of a connector, parts to lock the connector in place, parts to protect the connector, parts to aid alignment or separation of the connection, etc.

The housing may have at least one recess for mechanically interlocking with a cooperating protrusion on a disk drive carrier on which a said disk drive assembly is disposed within a said storage enclosure. This helps lock the dongle into position on the carrier, so that when the carrier is removed from the storage enclosure, the dongle is not left behind in the storage enclosure. In other words, it is the dongle-to-backplane connection that is broken, rather than the dongle-to-disk drive connection.

In a preferred embodiment, the dongle comprises at least one active component mounted on the PCB in electric communication with at least one of the pins of the disk drive connector and at least one of the fingers of the backplane connector. This allows the dongle to provide additional functionality. Preferably, the at least one active component is arranged to provide power control to a said disk drive assembly in use. This provides the advantage of having the active power control components for a disk drive assembly on an individually replaceable dongle rather than on the backplane of the storage enclosure, whilst providing a low cost solution compared with known dongle devices. If the power control components fail, the individual disk drive assembly can be removed from the storage enclosure without the whole storage enclosure having to be powered down so that the dongle can be replaced.

In embodiments, the at least one active component may comprise at least one power FET arranged to switch the power supply on at least one voltage input to the disk drive assembly. The at least one power FET may switch in response to an input signal received on a contact finger of the backplane connector. The dongle may comprise circuitry for decoding a said input signal from the backplane. The backplane connector may be arranged to receive a first voltage on at least one contact finger, the PCB comprising circuitry to convert said first voltage to at least a second voltage, said dongle being arranged to provide at least said second voltage on a pin of said disk drive connector.

In embodiments, one of the connectors is a SAS connector and/or one of the connectors is a SATA connector and/or one of the connectors is a SCA-2 connector. Both connectors may be of the same type or of different types. In principle, any connector of other type can be used.

According to a second aspect of the present invention, there is provided a dongle for connecting a disk drive assembly to the backplane of a storage enclosure, the dongle comprising: a disk drive connector for connecting to a disk drive assembly; a backplane connector for connecting to a backplane of a storage enclosure that has an otherwise unused pin; and, active components in electrical communication with at least one pin of each of said disk drive and backplane connectors arranged to provide power control to a said disk drive assembly in use, wherein the backplane connector is able to receive a power control signal from the otherwise unused pin of a said backplane and said active components are arranged to reset the power of a said disk drive assembly in response to said power control signal.

The preferred dongle of this aspect has the advantage of being capable of providing power control signals to the dongle using a standard interface, by re-using an otherwise unused pin.

In an embodiment, at least the backplane connector is a SAS connector. The pin that receives the power control signal may be a 3V3 power supply pin of the SAS connector or alternatively may be a 0V power supply pin of the SAS connector. The 3V3 pins of the interface may be used, since they are currently not used by standard disk drive assemblies. Alternatively, a 0V power supply pin from the backplane may be "borrowed".

The dongle may comprise at least one power FET for providing power control to a power supply input to a said disk drive assembly. One power FET may be provided for each of the 5V and 12V supplies. This allows independent control of the power supplies.

The dongle may be arranged to receive a single voltage level power supply, the dongle comprising: a DC-DC voltage converter for converting said single voltage level to at least one further voltage level, wherein said single voltage level and at least one further voltage level are supplied to a said disk drive assembly via 5V and 12V power lines of said disk drive connector. This allows a single rail power supply to be used in the storage enclosure.

The dongle may comprise path-switching components arranged to switch signals in use from a SATA disk drive assembly to the redundant port of a SAS backplane. This allows the dongle to in effect provide dual port functionality to a single port SATA disk drive assembly when used with a dual port SAS backplane.

There is also provided in combination, a disk drive carrier for supporting a disk drive assembly, and a dongle as described above, arranged so that in use a said disk drive assembly positioned in the carrier positioned in a said storage enclosure connects to a said backplane of the storage enclosure via the dongle.

According to a third aspect of the present invention, there is provided a method of manufacturing a dongle as described above, comprising: snap-fitting the PCB into the PCB holding portion of the housing. This provides a relatively simple way of attaching the PCB to the housing, by sliding the PCB into the recess in the housing until it snap-fits, whilst still being capable of providing a structurally rigid assembly.

Preferably, the housing has at least one window therethrough allowing external access to the PCB, the method comprising placing and/or bonding components and/or said contact pins to the PCB when situated in the housing through said window or windows in the PCB. This allows bulky components to be placed on the PCB after it has been slid into position through the recess. Thus the recess does not have to be enlarged to accommodate the bulky components and can maintain a tight fit to the PCB to provide a structurally rigid assembly. The windows also allow connections to be made between the contact pins of the plug connector portion and the PCB, for example by soldering or any other electrical connection technique.

According to a fourth aspect of the present invention, there is provided a method of manufacturing a dongle as described above, comprising: forming electrical connections between the disk drive connector and the PCB; and, overmoulding the PCB holding portion to disk drive connector portion.

The PCB may have at least one component mounted thereto before said overmoulding step. This simplifies manufacture and allows the PCB to be supplied already made.

Figure 2A:
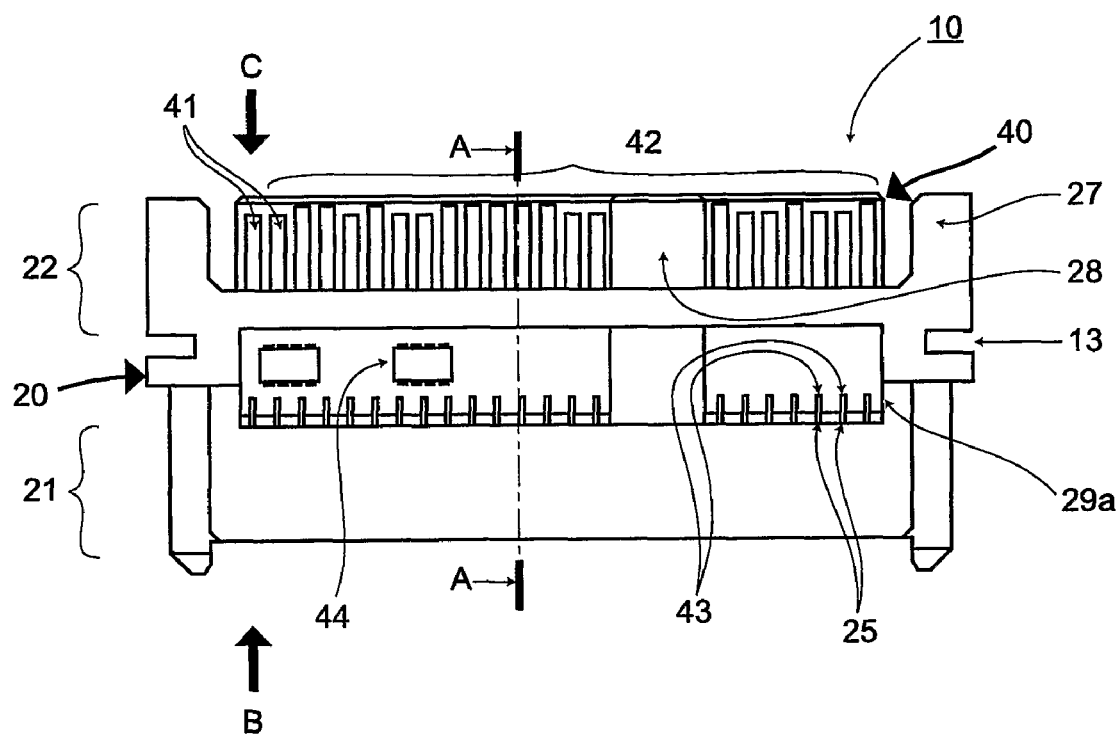
Figure 2B:
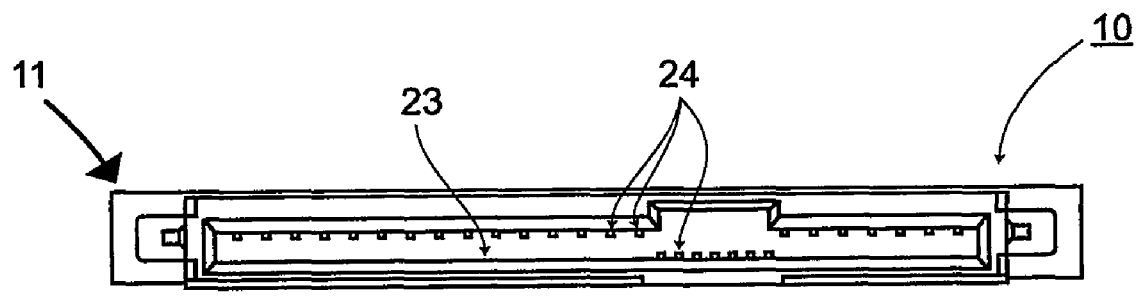
Figure 2C:
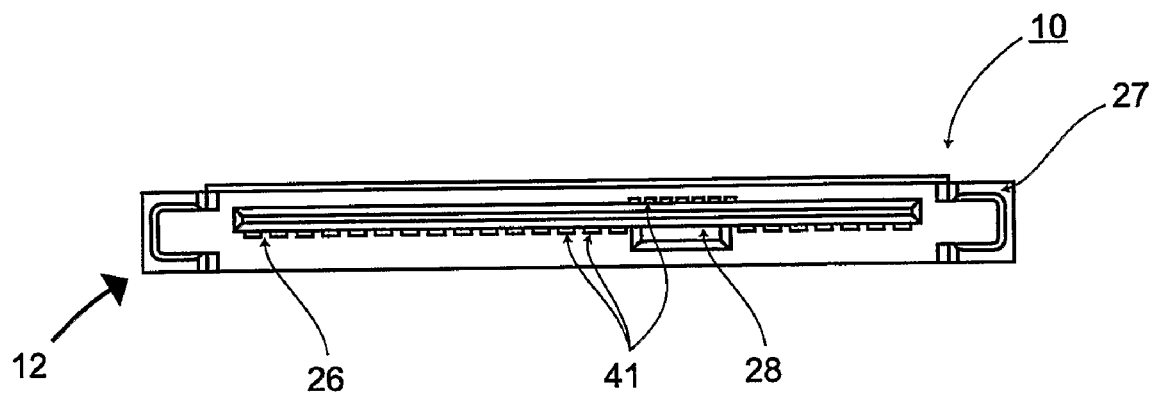
Figure 2D:
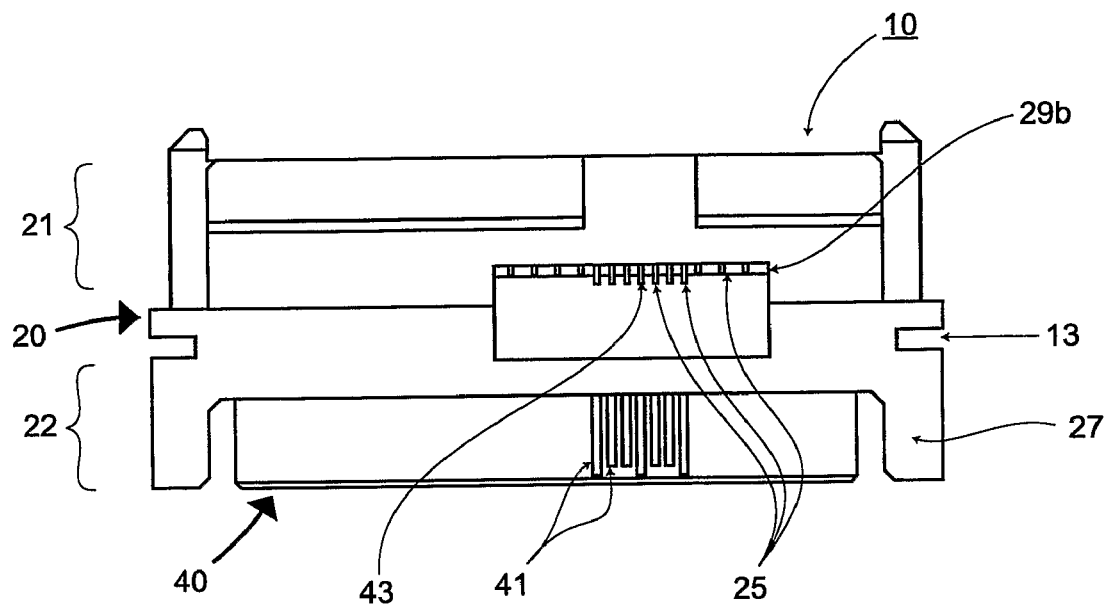
Figure 2E:
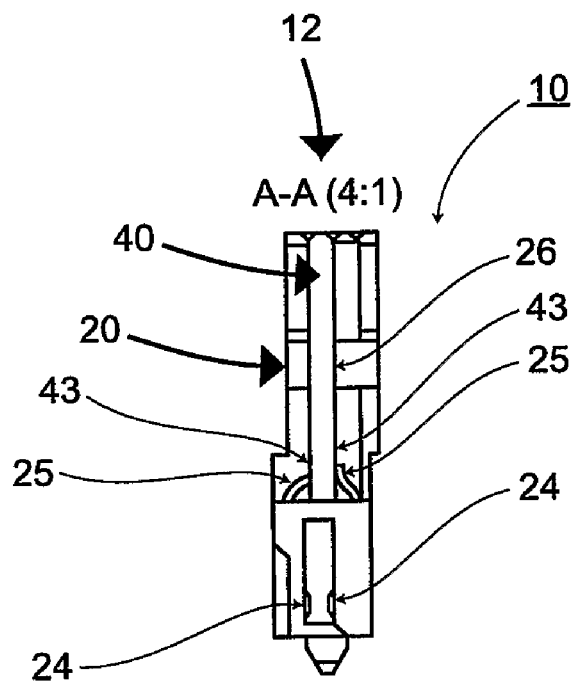
Figure 3A:
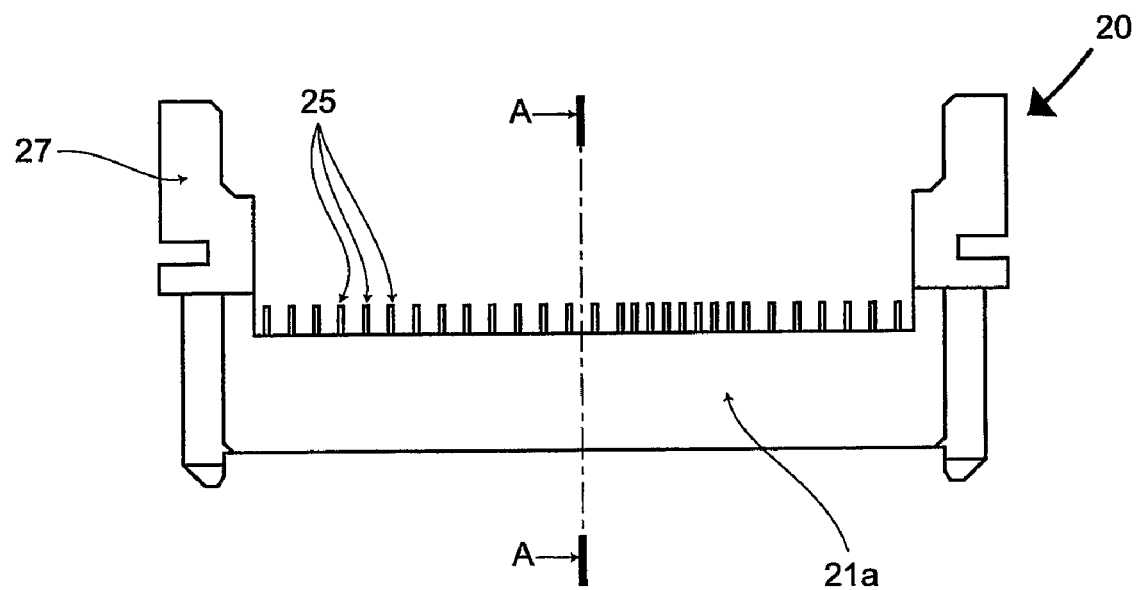
Figure 3B:
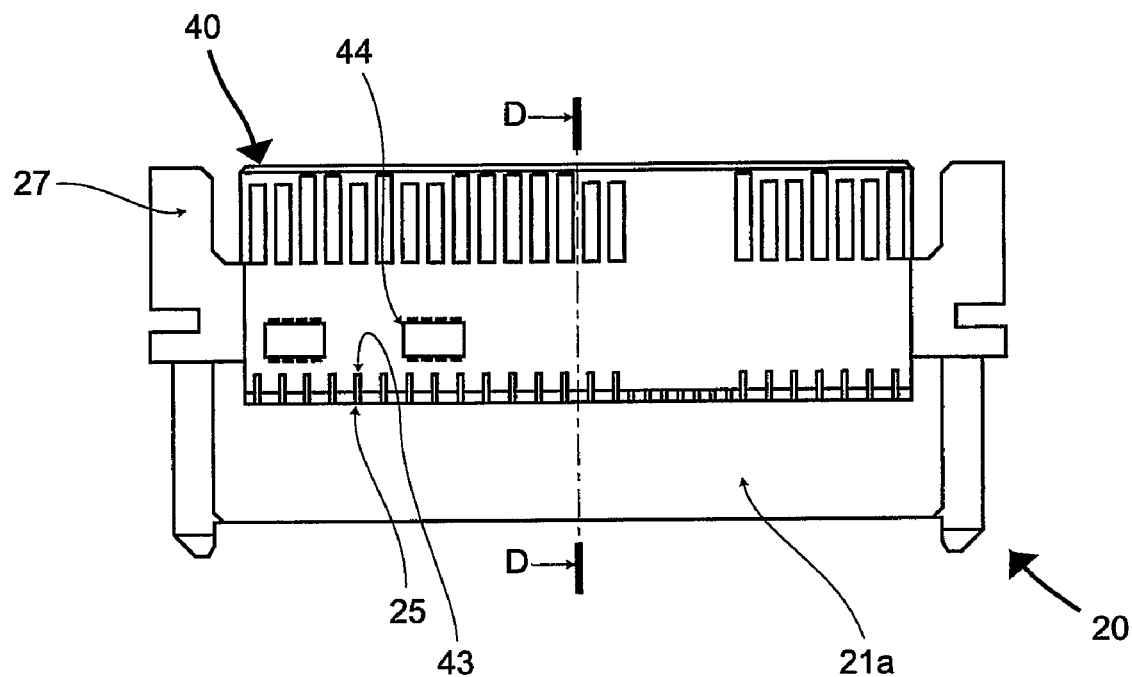
Figure 3C:
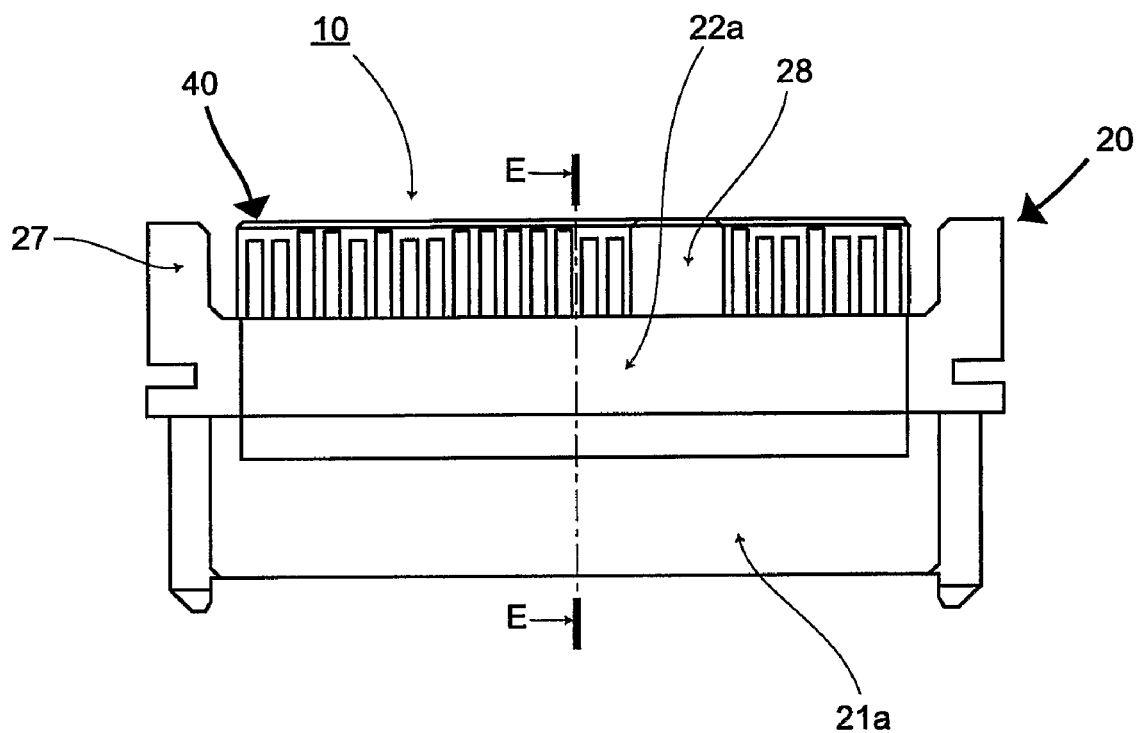
Figure 3D:
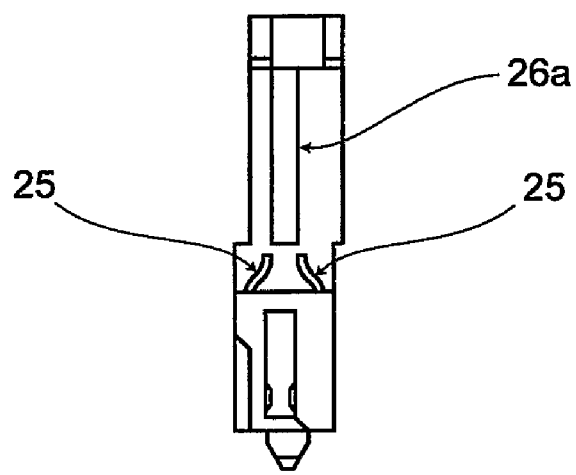
Figure 3E:
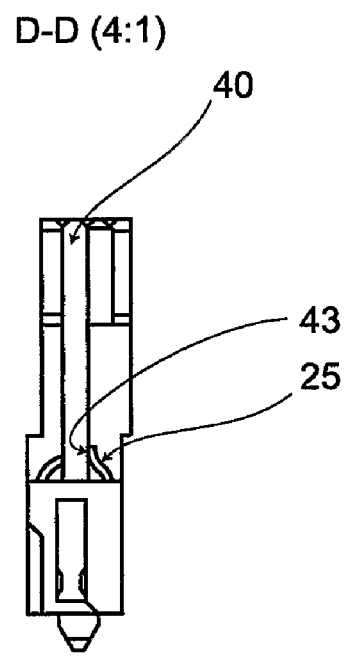
Figure 3F:
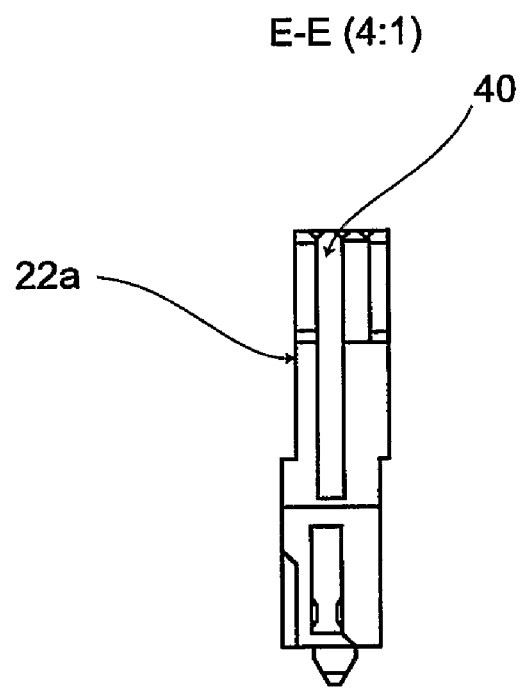
Figure 4A:
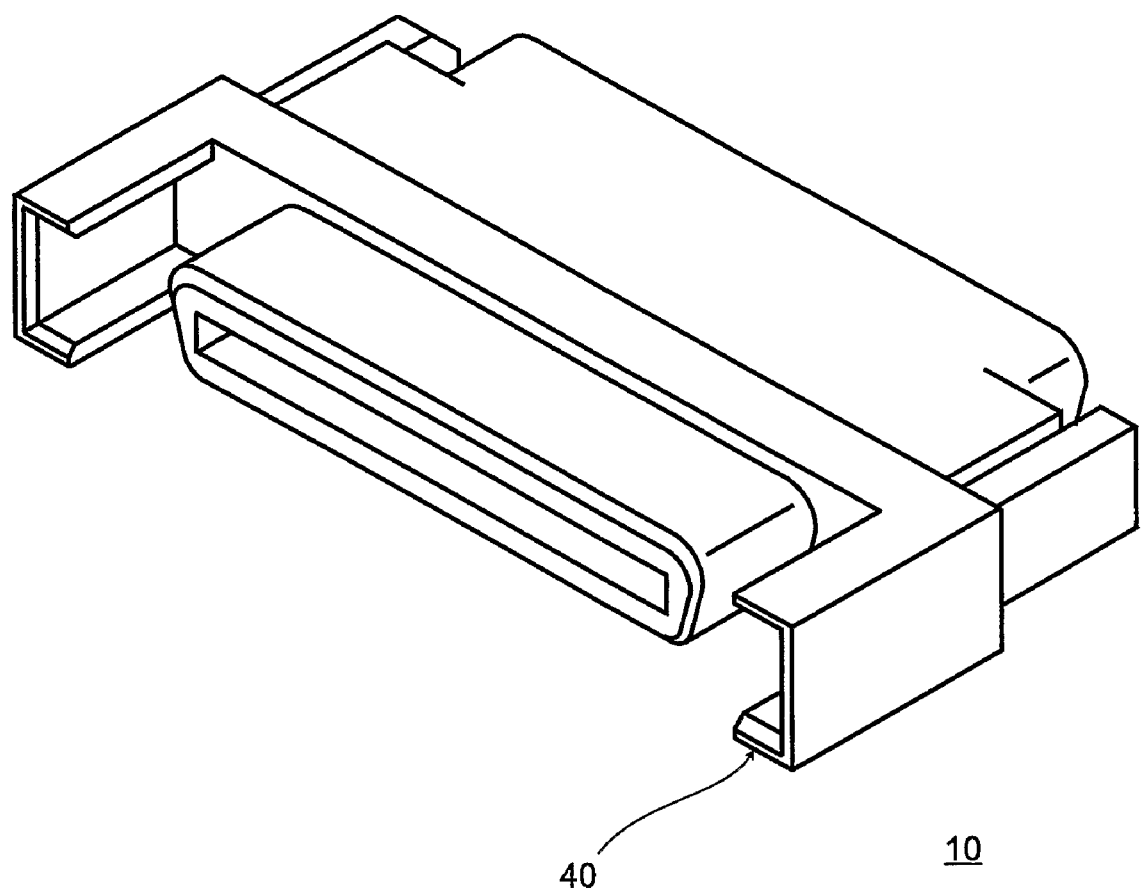
Figure 4B:
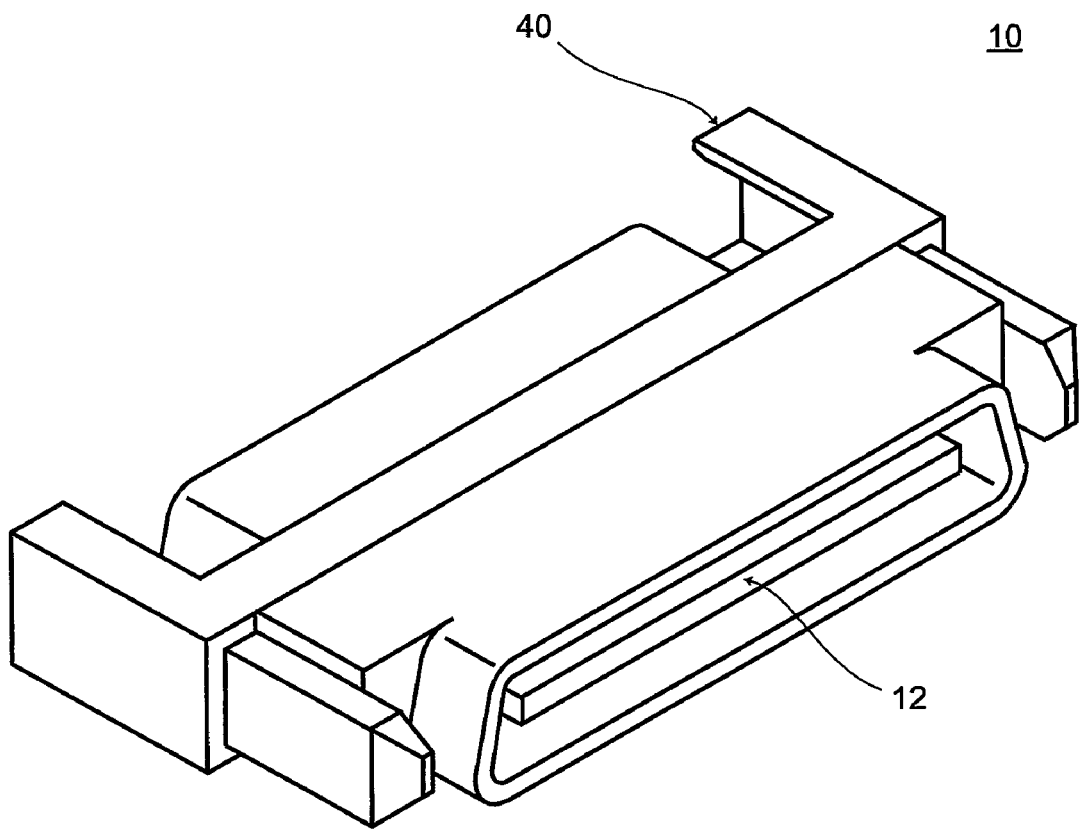
Figure 5A:
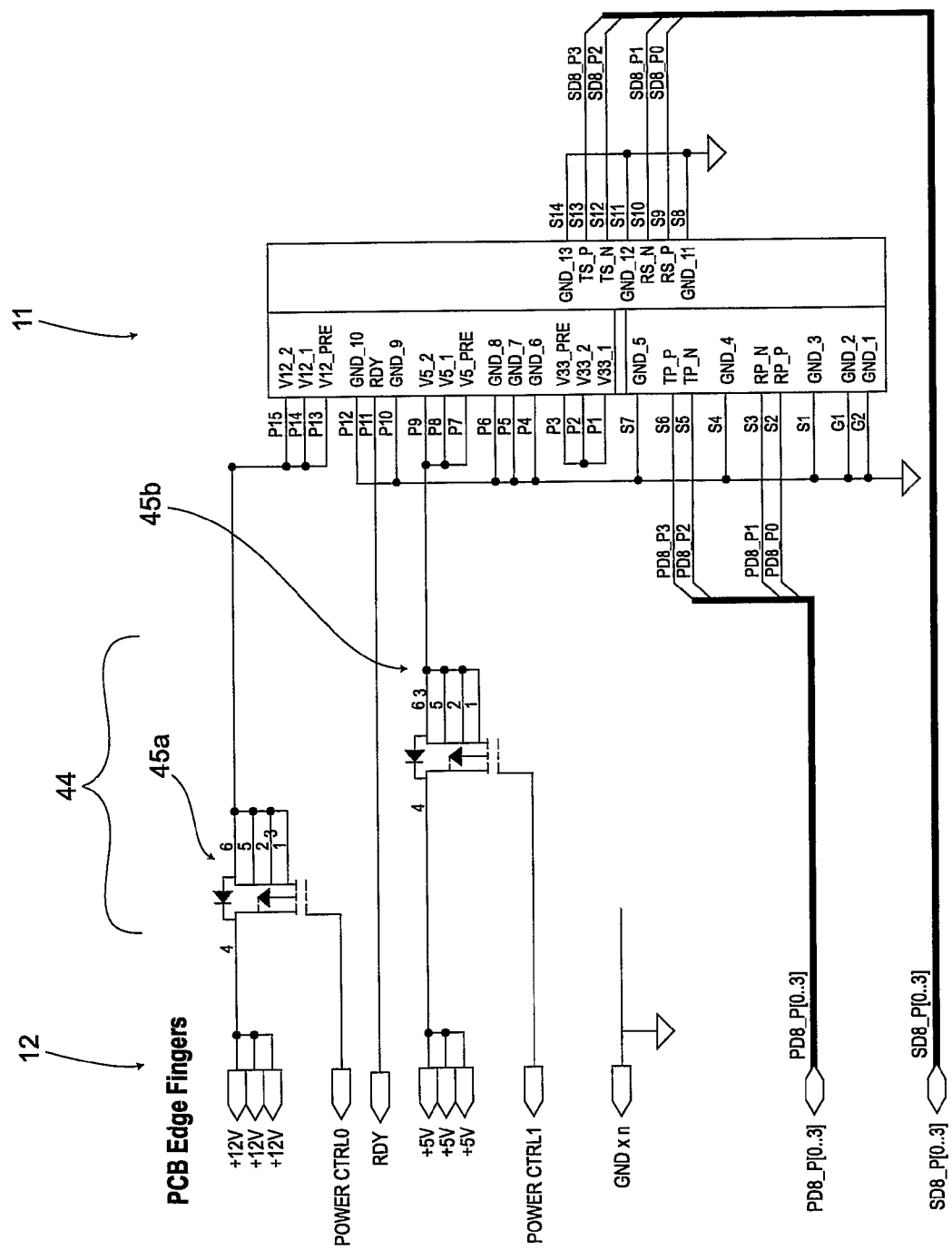
Figure 5B:
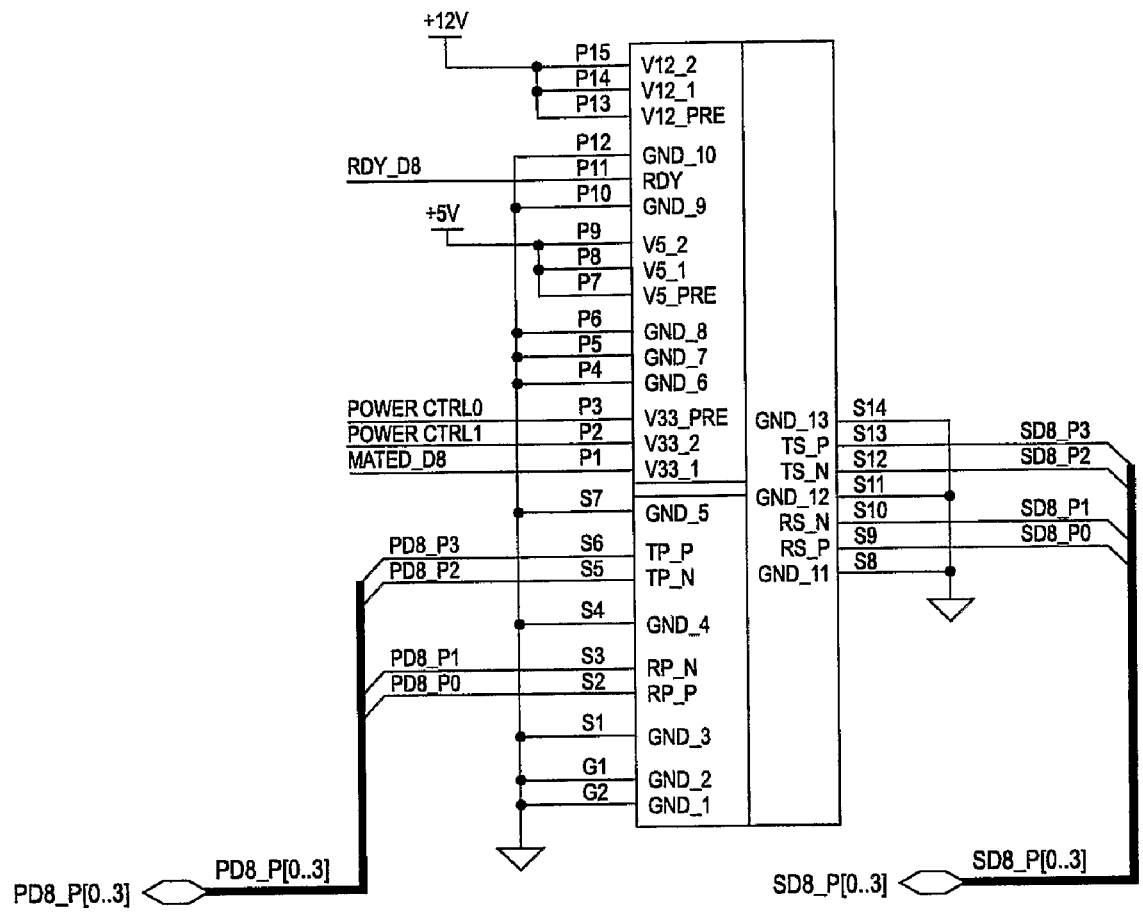

Embodiments of the present invention will now be described by way of example with reference to the accompanying drawings, in which:

FIG. 1 shows an example of a dongle in accordance with an embodiment of the present invention connected to a disk drive assembly;

FIG. 2a shows a bottom plan view of the dongle of FIG. 1; FIG. 2b shows an end plan view of the dongle of FIG. 2a in the direction of arrow B; FIG. 2c shows an end plan view of the dongle of FIG. 2a in the direction of arrow C; FIG. 2d shows a top plan view of the dongle of FIG. 2a; FIG. 2e shows a cross-sectional view of the dongle of FIG. 2a through line A-A;

FIGS. 3a, 3b and 3c show plan views of another example of a dongle in accordance with an embodiment of the present invention; FIGS. 3d, 3e and 3f show cross-sectional views of the views of FIGS. 3a, 3b and 3c along lines A-A, D-D and E-E respectively;

FIGS. 4a and 4b show a further example of a dongle in accordance with an embodiment of the present invention; and, FIG. 5a shows a circuit diagram of an example of a power control circuit for a dongle in accordance with the present invention and FIG. 5b shows a circuit diagram of an example of a backplane connector for use with the connector of FIG. 5a.

FIG. 1 shows a disk drive assembly 1 releasably mounted in a disk drive carrier 2 for use with a storage enclosure (not shown), such as are generally well known in the art. The disk drive assembly 1 has a connector interface 3 at the rear of the assembly. In the present example, the disk drive connector interface 3 is a SAS (or Serial Attached SCSI) plug (i.e. having a male connector), as defined by SFF-8482 "Specification for Unshielded Dual Port Serial Attachment Connector". A dongle 10 is attached to the disk drive connector interface 3. The dongle 10 generally has a dongle disk drive connector 11 for attaching to the disk drive connector, and a dongle backplane connector 12 for connecting to a SSF-8482 SAS socket (i.e. having a female connector) (not shown) on a backplane of a storage enclosure when the disk drive carrier is mounted in the storage enclosure.

It should be noted that in the present description the term "backplane" is used to refer generally to the part of the storage enclosure upon which are mounted the connectors for connecting to the disk drive assemblies. This term should be interpreted, as in the art, to include other parts of a storage enclosure suitable for mounting the connector, including by way of example midplanes, other custom circuit boards, etc.

The dongle 10 may have notches or recesses 13 in its exterior, which can accept corresponding lugs or protrusions 4 on the disk drive carrier 2 to allow the dongle 10 to be reversibly locked in place to the disk drive carrier 2. This prevents the dongle 10 from separating from the disk drive carrier 2 and thus from the disk drive assembly 1 when the disk drive carrier 2 is removed from the storage enclosure.

Referring to FIGS. 2a to 2e, the dongle 10 generally comprises a housing 20 and a PCB (printed circuit board) 40. The housing 20 generally has a socket portion 21 and a PCB holding portion 22.

The socket portion 21 of the housing 20 generally forms the dongle disk drive connector 11, and can be generally of a similar type and construction as any standard socket connector of that type. The socket portion 21 comprises a body having an opening 23 at one end for receiving and mating with the male plug connector 3 of the disk drive assembly 1, and a plurality of sprung contact pins 24 disposed within the opening 23 for making electrical connections with the male plug connector 3 of the disk drive assembly 1. Thus, in the present example, the socket portion 21 generally resembles a SSF-8482 SAS socket, for mating with the standard SSF-8482 SAS plug of the disk drive assembly 1. The contact pins 24 terminate in contact legs 25 which extend through the housing 20, terminating in the PCB holding portion 22 of the housing 20.

The PCB holding portion 22 of the housing 20 comprises walls that generally define a slot-like recess 26 in which the PCB 40 is positioned. The end of the PCB 40 that opposes the socket portion 21 of the housing 20 has metal contact fingers 41 disposed on its surface. In this example, the PCB 40 has contact fingers 41 on both its top and bottom surfaces, consistent with the layout of the pins in a SAS connector. This end of the PCB 40 thus in effect forms an edge connector 42 suitable for mating with the SSF-8482 SAS socket connector of the backplane of the storage enclosure.

The edge connector 42 generally extends beyond the housing 20, so as to be capable of mating with the backplane socket connector without interference. However, the housing 20 may have portions 27,28 that extend adjacent with the edge connector 42, so as to form part of the connector. These portions may aid the mechanical fit between the dongle 10 and the backplane or to protect the PCB 40 from external damage or for other reasons. For example, the housing 20 may have a finger portion 27 extending beyond the main body of the housing 20 lying alongside the PCB 40 on one side, forming a keyed part of the SAS connector. Other protrusions and shaping 27 of the housing 20 are possible, in order for example to aid in aligning the edge connector 42 with the socket connector of the backplane. Thus, the edge connector 42 of the PCB 40 and the adjacent housing portions 27,28 in effect form together the dongle backplane connector 12 in the form of a male SAS connector plug, suitable for connecting to the corresponding female SAS connector socket on the backplane of the storage enclosure.

The contact legs 25 of the contact pins 24 are connected to contact pads 43 on the PCB 40. Generally, the PCB 40 is arranged to electrically connect the corresponding pins of the dongle disk drive connector 11 to those of the dongle backplane connector 12. Thus, if desired, the PCB 40 can serve as a simple connector converter, converting one form of connector to another. Equally, the dongle 10 may have active components 44 on the PCB 40 to provide, for example, power control to the disk drive assembly 1 (as described further below) by operating on the lines of either connector.

A preferred method of manufacture of the dongle 10 provides that the PCB 40 is assembled into the housing 20 before any active components 44 are mounted to the PCB 40. The PCB 40 is slid into the recess 26 in the housing 20 through the open end of the recess 26. A tight interference fit may be provided between the housing 20 and the PCB 40 so as to give structural rigidity to the dongle assembly 10. Once the PCB 40 is in position within the recess 26, the contact legs 25 of the socket portion 21 can be joined to the contact pads 43 of the PCB 40, and the active components 44 can be placed onto and joined to the PCB 40. The walls of the housing 20 define windows 29a,29b allowing access to the portions of the PCB 40 within the recess 26 lying underneath the windows 29a, 29b. The windows 29a,29b allow access to the appropriate areas of the PCB 40 to allow components to be placed thereon and electrical connections to be formed thereto, for example by soldering. This allows the PCB 40 to be assembled to the housing 20 by sliding the PCB 40 into the housing 20 and then adding the bulky components to the PCB 40 when in situ, so that the recess 26 may be sized to be just large enough to accommodate the PCB 40 with a close fit, rather than it being necessary to have an enlarged recess to accommodate the passage of the bulky components when sliding the PCB 40 into the recess 26.

The PCB 40 and/or the housing 20 may have some mechanical means for retaining the PCB 40 within the housing 20. For example, the PCB 40 can have notches or grooves (not shown) which accept cooperating protrusions in the recess 26 to lock the PCB 40 in place. Thus, the PCB 40 can be "snap-fitted" into the recess 26 in the housing 12. The walls of the housing 20 are arranged to have sufficient resiliency to allow this. Preferably, the PCB 40 and housing 20 have a close or interference fit so as to give structural rigidity to the dongle assembly 10.

A further example of a dongle 10 is shown in FIGS. 3a to 3f. This dongle 10 is generally functionally similar to the example of FIG. 2. The main difference in this example is due to the method used in manufacturing the dongle 10. As shown in FIGS. 3a and 3d, the process starts with a housing 20 comprising only the socket portion 21a and optionally shaping 27, i.e. not including walls defining a recess 26. This part 21a is thus generally similar to a standard cable connector plug.

As shown in FIGS. 3b and 3e, the PCB 40 is then placed in position adjacent the socket portion 21a so that the contact legs 25 are adjacent to the contact pads 43 on the PCB 40. Optionally, the socket portion 21a also has grooves 26a (seen most clearly in FIG. 3d) to accept and guide the side edges of the PCB 40. Connections are then formed between the respective contact legs 25 and contact pads 43, for example by soldering. Since, in this manufacturing method, the PCB 40 does not have to pass into a narrow recess in the housing 20, the PCB 40 can be pre-assembled with the relatively bulky active components 44 and other circuitry already in place on the PCB 40.

The final step of the process, as shown in FIGS. 3c and 3f, is to overmould the PCB holding portion 22a of the housing 20 to complete the dongle backplane connector 12. The overmoulding serves to support and secure the PCB 40 in place in relation to the socket portion 21a of the housing 20. The overmoulding may optionally provide a finger portion 28 of the dongle backplane connector 12. The overmoulding may optionally also enclose the PCB circuitry 44 and the connections to the contact legs 25 so as to protect these components from external damage. There is no need to provide windows 29a,29b in the housing 20, as in the example of FIGS. 2a to 2e, since the PCB 40 is assembled and connected to the socket portion 21a of the housing 12 beforehand. The overmoulded PCB holding portion 22a of the housing 20 otherwise provides the same features and functionality as provided by the corresponding feature of the example of the dongle shown in FIGS. 2a to 2e.

As the skilled person will readily appreciate, the present invention is not limited to SAS connectors or indeed to any particular type of connector. Other connector types are contemplated, for example SATA connectors or SCA-2 connectors. FIGS. 4a and 4b show an example of a SCA-2 dongle formed in accordance with an embodiment of the present invention, with the PCB 40 together with the housing 40 forming an integral part of a SCA-2 connector. The edge connector 42 may form part of the dongle connector to the disk drive assembly or to the backplane. The dongle 10 can also be used as a converter, having a different connector type at each end, allowing a disk drive assembly and a backplane having different connector types to be connected together. The dongle may be used to perform other functions upon the power and data signals in the disk drive backplane connection other than power control, for example signal conversion.

FIG. 5a shows a schematic circuit diagram of an example of the layout of the components and connections of the dongle 10. The SAS standard provides a plurality of data and power lines for connecting to and from a disk drive assembly. In particular, the SAS connector provides 12V, 5V and 3V3 power lines to the disk drive assembly. Three pins in the SAS connector are used for each power supply in order to be able to source the necessary current. The SAS connector also provides data lines PD8_P[0 . . . 3] and SD8_P[0 . . . 3] for transferring data to and from the disk drive assembly.

In the present context, for the data lines, the PCB 40 simply connects together the respective data lines (PD8_P[0 . . . 3] and SD8_P[0 . . . 3]) for the dongle disk drive connector 11 and for the dongle backplane connector 12, so that data is transmitted between the disk drive assembly 1 and the storage enclosure without being affected by the dongle 10.

For the power lines, the PCB 40 has a power FET 45a,45b arranged to switch power for each of the 12V and 5V power supplies. A power FET is not used for the 3V3 power supply since in most disk drive assemblies only the 12V and 5V power supply are presently used, i.e. the 3V3 power supply is redundant. By suitable control signals (POWER CTRL0 and POWER CTRL1) being provided to the power FETs 45a,45b, the power delivered to the disk drive assembly 1 on the 12V and 5V supplies may be cycled. Preferably an individual power FET and individual control signal is used for each of the 12V and 5V power supply, so that these power supplies can be independently controlled. However, both can be controlled by a single signal and/or power FET if desired.

As previously mentioned, the 3V3 power supply is not used in current disk drive assemblies. As shown in FIG. 5b, this allows one or more of the three 3V3 power supply lines of the backplane connector to be used to send power control signals from the backplane of the storage enclosure to the dongle 10 to operate the power FETs 45a,45b to switch the power lines accordingly. Thus a standard SAS connector can be used between the backplane and the dongle 10 and can provide the extra power control signals without needing any extra connector to pass these signals to the dongle 10. Alternatively, any other pin of the backplane connector which is normally not used in electrically connecting to the disk drive assembly 1, or which can be made to be not used, can be used to send the power control signal or signals to the dongle 10. For example, one of the GND (0V) pins of the backplane connector can be "borrowed" to send the power control signal. The missing GND line can be supplied to the disk drive assembly 1 by tying the respective GND pin of the disk drive connector to another GND line received from the backplane connector.

In a further embodiment, the PCB 40 may contain a 12V-to-5V DC-to-DC voltage converter. The voltage converter is arranged to receive a 12V power supply from the backplane and to generate a 5V power supply. The 12V power supply and the converted 5V power supply are then provided to the appropriate pins of the dongle disk drive connector 13 to power the disk drive assembly 1. This allows the backplane to provide only a single 12V power supply only to the dongle 10, since the dongle 10 can generate the additionally required 5V power supply for use by the disk drive assembly 1. This allows a single rail PSU to be used for the storage enclosure. Thus, the dongles 10 may provide replaceable point-of-load (POL) converters.

In principle, the voltage converter may convert any power supply voltage received from the backplane to any other voltage or voltages for supply to the disk drive assembly 1. More than one voltage converter may be provided to convert a single power supply voltage received from the backplane to more than one other voltage. Also, it is not necessary for the power supply from the backplane to be supplied to the disk drive assembly 1 at the voltage at which it is received by the dongle 10. For example, it is expected that in the future 2.5 inch SATA disk drive assemblies utilising 3V3 and 5V for their power supply will become common. A dongle 10 for use with such a disk drive assembly may receive a 12V power supply from the backplane and convert this voltage to a 5V and a 3V3 power supply by way of two voltage converters and provide these 5V and 3V3 power supplies to the disk drive assembly. Thus a backplane may be provided having a single 12V power supply, while disk drives assemblies requiring different power supply voltages can be used with the backplane by connecting dongles 10 with appropriate power conversion circuitry between them.

In a further embodiment, a dongle 10 is provided to connect a SATA disk drive assembly 1 to a SAS backplane. The SATA interface generally has a single channel or port for data communication, whereas the SAS interface generally has dual ports allowing connection to be made to two hosts. Thus if a SATA disk drive assembly is used with a SAS backplane, one channel of the SAS connector is not used. The PCB 40 contains components, for example wide band CMOS RF switches, allowing path-switching of the SATA signals to the redundant SAS channel. This allows the SATA disk drive assembly having a single communication channel to communicate with each of the two host ports on the SAS connector and thereby to each of two separate host computers connected to the host ports.

Embodiments of the present invention have been described with particular reference to the examples illustrated. However, it will be appreciated that variations and modifications may be made to the examples described within the scope of the present invention.

The invention claimed is:

1. A dongle for connecting a disk drive assembly to a backplane of a storage enclosure, the dongle comprising:
    a housing having a disk drive connector portion having a plurality of contact pins for connecting to a disk drive assembly and having a PCB holding portion having walls that define a recess;
    a PCB located within the recess, the PCB having a plurality of contact fingers on at least one surface at an edge of the PCB to form a backplane connector for connecting to a said backplane, wherein at least some of the disk drive connector contact pins are in electrical connection with at least some of the contact fingers of the backplane connector; and, at least one active component mounted on the PCB in electric communication with at least one of the pins of the disk drive connector and at least one of the fingers of the backplane connector.

2. A dongle according to claim 1, wherein the housing walls are arranged to mechanically lock to and rigidly support the PCB.

3. A dongle according to claim 1, wherein the housing has at least one recess for mechanically interlocking with a cooperating protrusion on a disk drive carrier on which said disk drive assembly is disposed within said storage enclosure.

4. A dongle according to claim 1, wherein the at least one active component is arranged to provide power control to said disk drive assembly in use.

5. A dongle according to claim 4, wherein the at least one active component comprises at least one power FET arranged to switch the power supply on at least one voltage input to the disk drive assembly.

6. A dongle according to claim 5, wherein the at least one power FET switches in response to an input signal received on a contact finger of the backplane connector.

7. A dongle according to claim 6, comprising circuitry for decoding said input signal from the backplane.

8. A dongle according to claim 1, wherein the backplane connector is arranged to receive a first voltage on at least one contact finger, the PCB comprises circuitry to convert said first voltage to at least a second voltage, and said dongle is arranged to provide at least said second voltage on a pin of said disk drive connector.

9. A dongle according to claim 1, wherein one of the connectors is a SAS connector.

10. A dongle according to claim 1, wherein one of the connectors is a SATA connector.

11. A dongle according to claim 1, wherein one of the connectors is a SCA-2 connector.

12. A dongle according to claim 1, wherein both connectors are of the same type.

13. A dongle according to claim 1, comprising path-switching components arranged to switch signals in use from a SATA disk drive assembly to the redundant port of a SAS backplane.

14. In combination, a disk drive carrier for supporting a disk drive assembly, and a dongle according to claim 1 mounted on the carrier, arranged so that in use said disk drive assembly positioned in the carrier positioned in said storage enclosure connects to said backplane of the storage enclosure via the dongle.

15. A method of manufacturing a dongle according to claim 1, comprising:
    snap-fitting the PCB into the PCB holding portion of the housing.

16. A method according to claim 15, wherein the housing has at least one window therethrough allowing external access to the PCB, the method comprising placing and/or bonding components and/or said contact pins to the PCB when situated in the housing through said window or windows in the PCB.

17. A method of manufacturing a dongle according to claim 1, comprising:
    forming electrical connections between the disk drive connector and the PCB; and,
    overmoulding the PCB holding portion to the disk drive connector portion.

18. A method according to claim 17, wherein the PCB has at least one component mounted thereto before said overmoulding step.

19. A dongle for connecting a disk drive assembly to a backplane of a storage enclosure, the dongle comprising:
    a disk drive connector for connecting to a disk drive assembly;
    a backplane connector for connecting to a backplane of a storage enclosure that has an otherwise unused pin; and,
    active components in electrical communication with at least one pin of each of said disk drive and backplane connectors arranged to provide power control to said disk drive assembly in use, wherein the backplane connector is able to receive a power control signal from the otherwise unused pin of said backplane and said active components are arranged to reset the power of said disk drive assembly in response to said power control signal.

20. A dongle according to claim 19, wherein at least the backplane connector is a SAS connector.

21. A dongle according to claim 20, wherein the pin that receives the power control signal is a 3V3 power supply pin of the SAS connector.

22. A dongle according to claim 20, wherein said pin that receives the power control signal is a 0V power supply pin of the SAS connector.

23. A dongle according to claim 19, comprising at least one power FET for providing power control to a power supply input to said disk drive assembly.

24. A dongle according to claim 23, comprising one power FET for each of 5V and 12V supplies from said backplane.

25. A dongle according to claim 19, wherein the dongle is arranged to receive a single voltage level power supply from the backplane, the dongle comprising:
    a DC-DC voltage converter for converting said single voltage level to at least one further voltage level, wherein said single voltage level and at least one further voltage level are supplied to said disk drive assembly via 5V and 12V power lines of said disk drive connector.

* * * * *